May 9, 1939.  G. F. SMITH  2,157,869
POWER SYSTEM
Filed Oct. 31, 1936
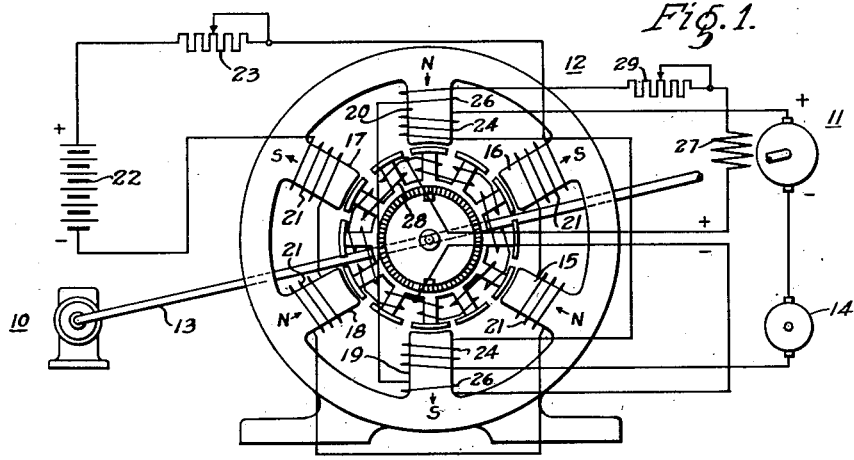
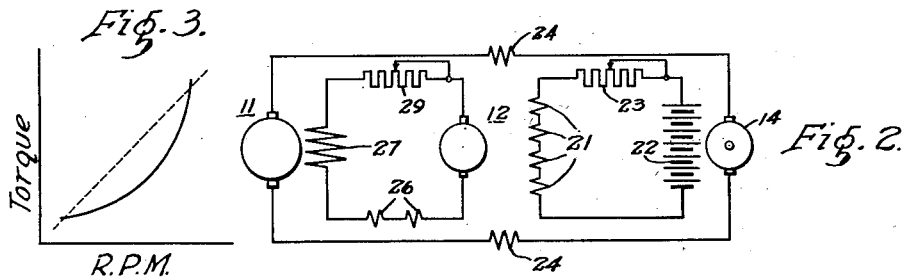
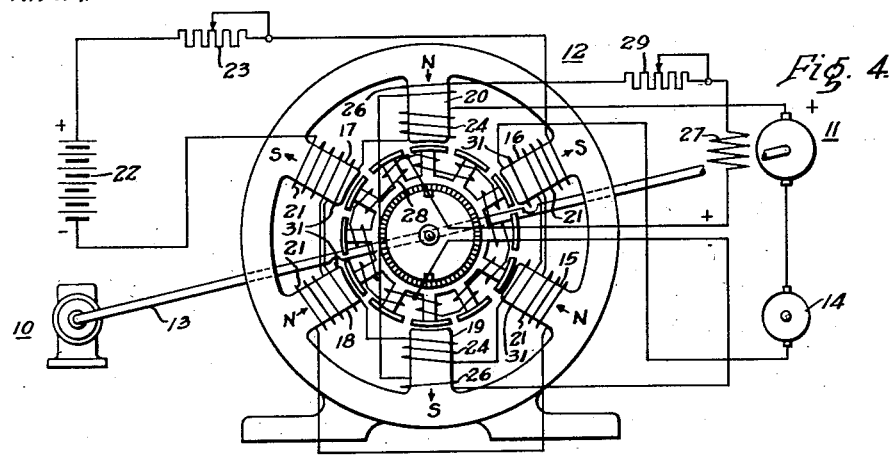
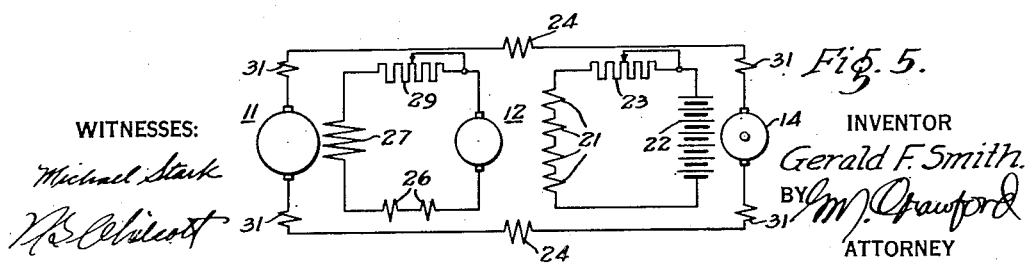
WITNESSES:
Michael Stark
INVENTOR
Gerald F. Smith.
BY
ATTORNEY Patented May 9, 1939

2,157,869

UNITED STATES PATENT OFFICE 2,157,869

POWER SYSTEM

Gerald F. Smith, Forest Hills, Pa., assignor to Westinghouse Electric & Manufacturing Company, East Pittsburgh, Pa., a corporation of Pennsylvania Application October 31, 1936, Serial No. 108,597

4 Claims. (Cl. 171—223)

My invention relates, generally, to power systems for self-propelled vehicles and, more particularly, to power systems wherein an internal-combustion engine drives an electric generator which supplies current for operating electric motors to propel the vehicle.

The present invention constitutes an improvement over the system disclosed in my Patent 1,730,340, issued October 1, 1929, in which an engine drives a generator and an exciter for the generator, the exciter having a differential winding on a portion of its poles which is energized by the main generator current in order to produce certain operating characteristics in the electrical machines which improve the performance of the Diesel or gas engine.

An object of the present invention is to improve the engine loading characteristics of a power system in which an internal-combustion engine is utilized as the prime mover.

Another object of the invention is to maintain a predetermined speed of the prime mover of a self-propelled vehicle.

Other objects of the invention will be explained fully hereinafter or will be apparent to those skilled in the art.

In accordance with one embodiment of the present invention a portion of the field poles on the exciter for a power-generating system, comprising an engine, a generator and an exciter for the generator, are provided with a separately excited shunt field winding and the remaining poles are provided with a differential winding which is energized by the main generator load current, as in the system described in my aforementioned patent. In addition to the differential winding, these poles are also provided with a cumulative winding which is connected in series with the exciter armature circuit to improve the engine loading characteristics, as will be explained more fully hereinafter.

For a fuller understanding of the nature and objects of the invention, reference may be had to the following detailed description, taken in conjunction with the accompanying drawing in which:

Figure 1 is a diagrammatic view of a power system for self-propelled vehicles embodying my invention;

Fig. 2 is a diagram of connections used in the power system;

Fig. 3 is a curve showing operating characteristics of the power system;

Fig. 4 is a diagrammatic view of a modified form of a power system similar to the one shown in Fig. 1; and Fig. 5 is a diagram of the connections used in the modification of the invention shown in Fig. 4.

Referring now to the drawing, and particularly to Figs. 1, 2 and 3, the power system illustrated comprises an internal combustion engine 10 which drives a generator 11 and an exciter 12 for the generator 11, by means of a shaft 13. The generator 11 may be utilized to furnish power for operating a motor 14 which is suitable for propelling a locomotive or other vehicle (not shown).

As described in my foregoing Patent No. 1,730,340, the exciter 12 is provided with a plurality of field poles 15 to 20, inclusive. Four of the poles, 15 to 18, inclusive, are provided with separately excited windings 21 which may be energized from a battery 22. An adjustable rheostat 23 may be utilized for adjusting the current in the field windings 21. The other two poles, 19 and 20, are provided with differential windings 24 which are connected in series-circuit relation with the armature of the generator 11 and are energized by the current in the load circuit for the generator.

It will be understood that the windings 21 and 24 function in the same manner as described in my foregoing patent, the differential windings 24 opposing the flux established by the windings 21, thereby causing the exciter to have certain characteristics similar to the exciter utilized in the system disclosed in my prior patent.

In order to improve the engine loading characteristics of the system, I have provided another winding 26 on the field poles 19 and 20. The winding 26 is connected in series-circuit relation with the field winding 27 of the generator 11, which is connected across the armature 28 of the exciter 12. Therefore, the generator is excited in accordance with the voltage developed by the exciter 12, a rheostat 29 being provided for adjusting the generator field current and the winding 26 is energized by the generator field current. The addition of the cumulative field winding 26 to the poles 19 and 20 does not materially change the exciter-voltage generator-amperes characteristic of the machines which remains practically the same as for the machines described in my prior patent.

However, the torque-speed characteristic of the present machines is as shown by the full line curve in Fig. 3. In this instance the torque decreases approximately as the square of the speed instead of directly as the speed, as in the system described in my prior patent and indicated by the dotted line in Fig. 3. Therefore, the speed of the engine is maintained practically constant, since with a decrease in engine output, and a consequent decrease in engine speed, the torque falls rapidly to minimize the speed decrease by automatically unloading the engine. It will be seen from the curve in Fig. 3 that this decrease in torque is rapid at high speed and full load, where it is most effective in maintaining a predetermined engine speed.

In the modification of the invention shown in Figs. 4 and 5, a cumulative field winding 31 is added to each of the poles 15 to 18, inclusive, in addition to the separately excited winding 21, previously described. The windings 31 are connected in series-circuit relation with the differential windings 24 and are energized by the current in the generator load circuit.

The cumulative windings 31 are utilized to provide a lower no-load exciter voltage. Since the cumulative effect produced by the windings 31 depends upon the generator load current, it is evident that at no-load the windings 31 produce no flux and therefore, the exciter voltage is reduced at no-load. The winding 26 on the poles 19 and 20 functions in the manner described hereinbefore to decrease the torque on the engine in the event of a decrease in speed, thereby maintaining a predetermined engine speed.

It will be understood that the desired operating characteristics may be obtained in a power system of the type herein described by providing the generator, instead of the exciter, with differential and cumulative field windings as described hereinbefore. Therefore, my invention is not limited in its application to machines utilized as exciters but may be applied to any dynamo-electric machine.

Furthermore, it is evident that the improved operating characteristics of a power system of the type herein described may be obtained by utilizing a split pole dynamo-electric machine in which the cumulative winding 26 is disposed on only a portion of the pole structure of each pole on the machine, thereby obtaining the same magnetic effect as in the structures herein described.

From the foregoing description it is evident that I have improved the engine loading characteristics of a power system in which an internal-combustion engine is utilized as the prime mover, thereby maintaining a predetermined speed of the engine, which improves its operating efficiency.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. An exciter for energizing the field winding of an engine-driven generator for supplying current to a load circuit, said exciter being driven by the engine and provided with an armature winding connected in series-circuit relation with the field winding of the generator, a separately excited field winding, a differential field winding energized by the current in said generator load circuit, and a cumulative field winding connected in series-circuit relation with the exciter armature winding.

2. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, and a cumulative field winding connected in series-circuit relation with the exciter armature winding.

3. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, and a cumulative field winding disposed on the same poles as the differential field winding and connected in series-circuit relation with the exciter armature winding.

4. An exciter for energizing the field winding of an engine-driven generator for supplying current to a load circuit, said exciter being driven by the engine and provided with an armature winding connected in series-circuit relation with the field winding of the generator, a separately excited field winding disposed on a portion of the field poles of the exciter, a differential field winding disposed on the remaining field poles of the exciter and energized by the current in said generator load circuit, a cumulative field winding disposed on the same poles as the differential field winding and connected in series-circuit relation with the exciter armature winding, and an additional cumulative field winding disposed on the same poles as the separately excited winding, said additional winding being energized by the current in the generator load circuit.

GERALD F. SMITH.